(12) United States Patent
Nakagawa et al.

(10) Patent No.: US 8,083,977 B2
(45) Date of Patent: Dec. 27, 2011

(54) GOLF BALL MOLD, GOLF BALL AND METHOD OF MANUFACTURING A GOLF BALL

(75) Inventors: Takuma Nakagawa, Chichibu (JP); Katsunori Sato, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 12/648,513

(22) Filed: Dec. 29, 2009

(65) Prior Publication Data

US 2011/0159989 A1 Jun. 30, 2011

(51) Int. Cl.
*B29C 70/70* (2006.01)
*B29C 45/14* (2006.01)

(52) U.S. Cl. ............ 264/161; 264/162; 264/279.1; 425/116; 425/129.1

(58) Field of Classification Search ............ 425/116, 425/129.1; 264/279.1, 161, 162; 473/377, 473/378, 383
See application file for complete search history.

(56) References Cited

U.S. PATENT DOCUMENTS

| | | | |
|---|---|---|---|
| 5,122,046 A * | 6/1992 | Lavallee et al. .......... 425/116 |
| 5,824,258 A * | 10/1998 | Yamaguchi ............ 264/328.1 |
| 5,827,466 A * | 10/1998 | Yamaguchi ............ 264/279.1 |
| 5,874,038 A | 2/1999 | Kasashima et al. |
| 6,123,534 A | 9/2000 | Kasashima et al. |
| 6,632,078 B2 | 10/2003 | Ogg et al. |
| 6,685,456 B2 | 2/2004 | Sajima |
| 7,150,618 B2 | 12/2006 | Sajima et al. |
| 7,618,333 B2 | 11/2009 | Nardacci et al. |
| 2001/0048180 A1 * | 12/2001 | Cupples ................. 264/275 |
| 2007/0232411 A1 | 10/2007 | Inoue et al. |
| 2008/0064531 A1 * | 3/2008 | Nardacci et al. ........ 473/379 |
| 2010/0197428 A1 * | 8/2010 | Aoyama et al. ........ 473/379 |

FOREIGN PATENT DOCUMENTS

| | | | |
|---|---|---|---|
| JP | 05084329 A | * | 4/1993 |
| JP | 6-143349 A | | 5/1994 |
| JP | 08034036 A | * | 2/1996 |
| JP | 8-173576 A | | 7/1996 |
| JP | 10-127826 A | | 5/1998 |
| JP | 11-70186 A | | 3/1999 |

(Continued)

OTHER PUBLICATIONS

Partial machine translation of JP-08034036 A dated Feb. 6, 1996 obtained from the JPO website.*

*Primary Examiner* — Robert B Davis
(74) *Attorney, Agent, or Firm* — Sughrue Mion, PLLC (57) ABSTRACT

A golf ball mold that is composed of a plurality of mold parts which removably mate to form a cavity having an inner wall with a plurality of dimple-forming protrusions thereon, wherein a non-circular resin injection port is formed between a plurality of mutually adjoining dimple-forming protrusions which include dimple-forming protrusions that lie across a parting line of the mold. Also provided is a golf ball molded using such a mold, and a golf ball manufacturing method which uses such a mold. By using the mold of the invention, even when manufacturing golf balls with a high dimple surface coverage on which the dimples are tightly arranged particularly up to the vicinity of the resin injection port, imbalances in the resin injection pressure and flow rate during injection molding are suppressed, enabling golf balls to be manufactured without production problems such as molding defects, scorching, core deformation and core eccentricity.

12 Claims, 9 Drawing Sheets

FOREIGN PATENT DOCUMENTS

| | | | |
|---|---|---|---|
| JP | 11-137727 A | | 5/1999 |
| JP | 2000-42143 A | | 2/2000 |
| JP | 2000185116 A | * | 7/2000 |
| JP | 2001-170217 A | | 6/2001 |
| JP | 2001-187172 A | | 7/2001 |
| JP | 2001187172 A | * | 7/2001 |
| JP | 2002-159598 A | | 6/2002 |
| JP | 2004-89549 A | | 3/2004 |
| JP | 2006-212057 A | | 8/2006 |
| JP | 2007-136182 A | | 6/2007 |
| JP | 2007-159715 A | | 6/2007 |
| JP | 2007-268265 A | | 10/2007 |

* cited by examiner

GOLF BALL MOLD, GOLF BALL AND METHOD OF MANUFACTURING A GOLF BALL

BACKGROUND OF THE INVENTION

The present invention relates to a golf ball mold suitable for molding solid golf balls composed of a core encased by one or more cover layer, and thread-wound golf balls. The invention relates also to golf balls molded using such a mold, and to a method of manufacturing golf balls using such a mold.

Molds for molding golf balls are generally composed of a plurality of parts which removably mate to each other; a golf ball is manufactured by feeding a golf ball molding material to a cavity that forms at the interior of the mold when these mold parts are mated. From the standpoint of ease of mold fabrication and ball moldability, etc., the parting plane of each mold part is often rectilinear in shape without concavities and convexities. Parting planes having such a rectilinear shape are often coincident with the equator of the golf ball. Thus, in golf balls molded with such a mold, dimples are not formed on the equator which corresponds to the parting plane; instead, a somewhat wide great circle forms at the equator.

However, in a golf ball having at the equator a wide great circle across which there lie no dimples, it is difficult to achieve a uniform arrangement of dimples on the spherical surface of the ball. This leads to a lack of uniformity in the aerodynamic symmetry of the ball, giving rise to a variability in the flight performance due to differences on where the ball is hit.

Figure 8:
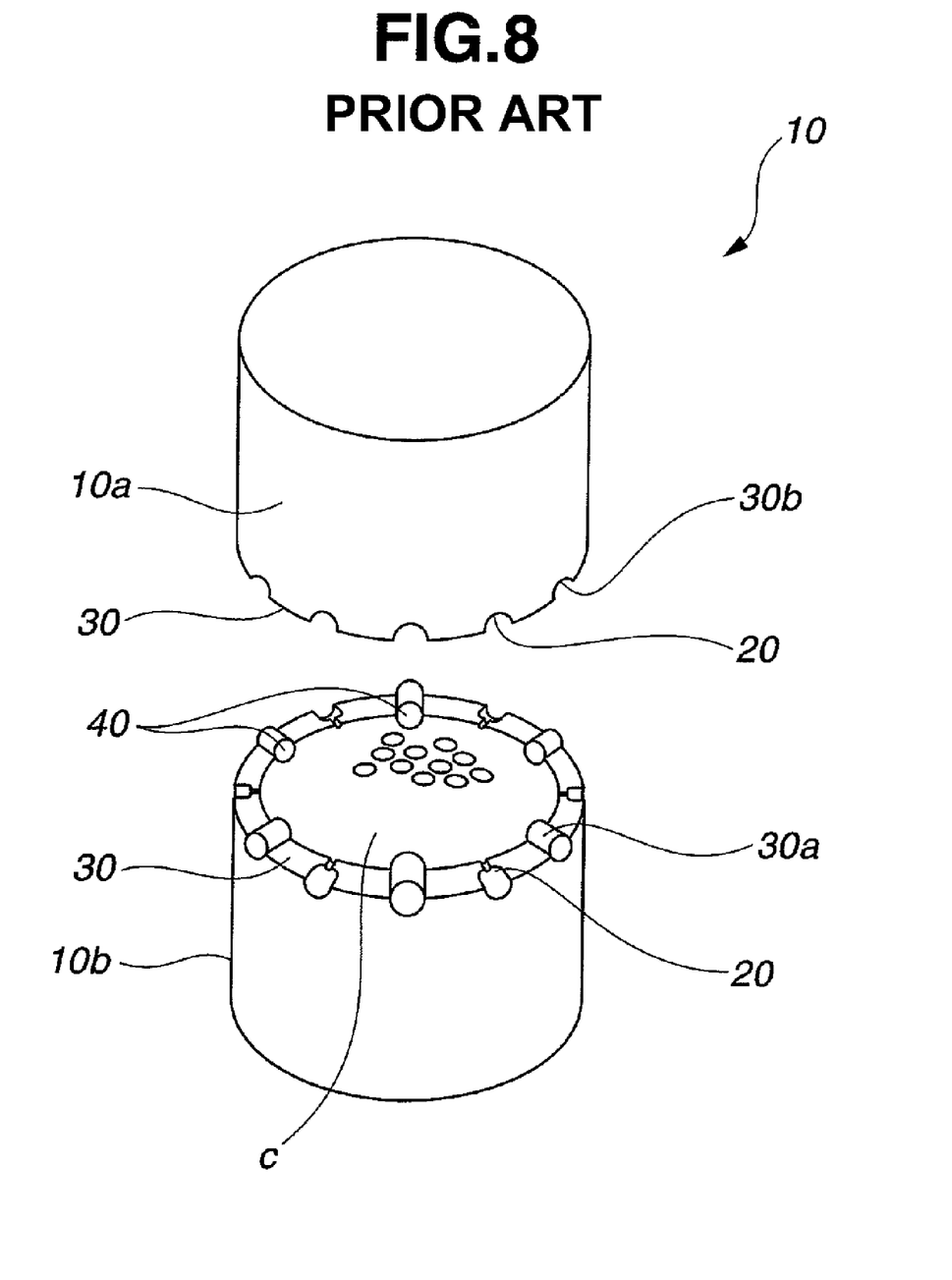
FIG. 8 is a schematic perspective view showing a conventional golf ball mold.

For this reason, efforts have been made to form dimples which lie across the equator and thereby eliminate a wide great circle on the equator. For example, JP-A 10-127826 discloses a golf ball mold 10 having a construction wherein, as shown in FIG. 8, an upper mold half 10a and a lower mold half 10b removably mate to form at the interior a hollow spherical cavity c having an inner wall with numerous dimple-forming protrusions 40 thereon. In addition, the parting planes 30 on the upper and lower mold halves are formed in concavo-convex shapes, and dimple-forming protrusions 40 are situated so as to lie across the parting line PL at the concavo-convexly shaped areas. In this mold 10, to form dimples which lie across the parting line PL, cylindrical pins (convex features) 30a having dimple-shaped ends are provided on the parting plane 30 of the lower mold half 10b and circular holes (concave features) 30b corresponding to the cylindrical pins (convex features) 30a are formed on the parting plane 30 of the upper mold half 10a so that these fit together when the upper and lower mold halves are mated. Also shown in the diagram is a resin injection port 20.

In addition to the foregoing, numerous disclosures have been made wherein, to have dimples lie across the golf ball equator, the parting plane of the mold is given a shape that is concavo-convex rather than rectilinear, with all or part of a dimple-forming protrusion being disposed on the convex portions thereof (e.g., JP-A 06-143349, JP-A 08-173576, JP-A 11-070186, JP-A 11-137727, JP-A 2001-170217, JP-A 2001-187172, JP-A 2002-159598, JP-A 2004-089549, JP-A 2006-212057, JP-A 2007-136182, JP-A 2007-159715 and JP-A 2007-268265).

At the same time, when one takes into account the aerodynamic properties of golf balls, providing dimples on a greater portion of the golf ball surface is desirable, such desirable effects being known to increase as the total surface area of the dimples as a proportion of the golf ball surface area (surface area coverage) approaches 100%. Hence, to improve the symmetry of the aerodynamic properties in this way and achieve an even further increase in performance, bringing the dimple surface coverage close to 100% is important.

Figure 9:
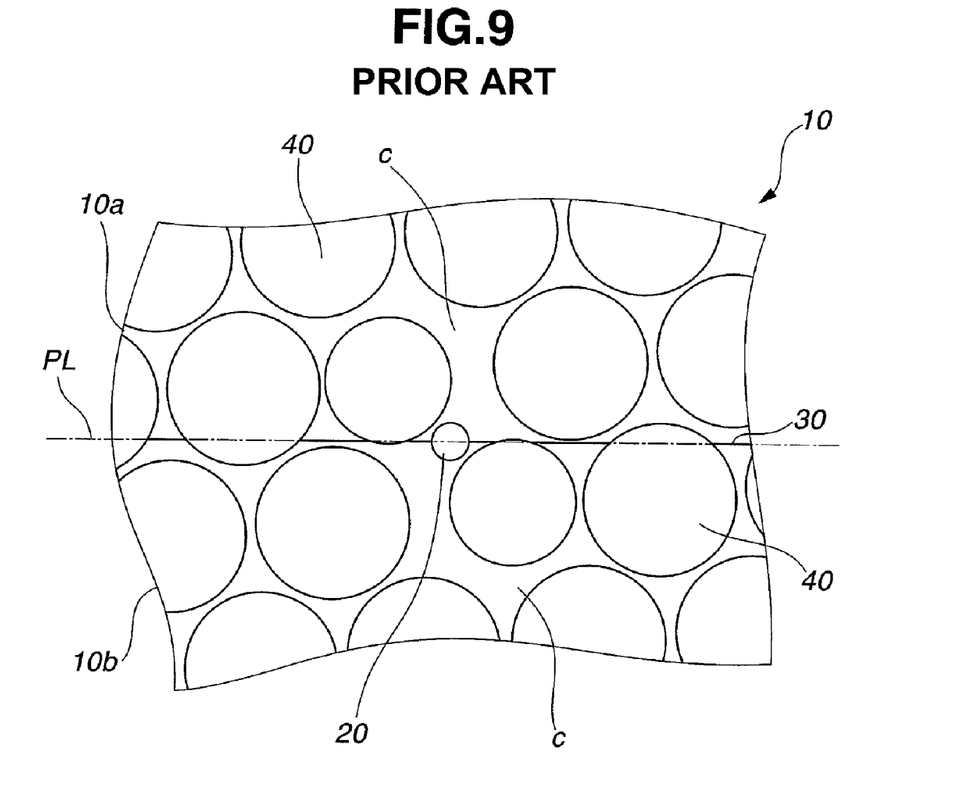
FIG. 9 is an enlarged plan view of the vicinity of a resin injection port in a conventional golf ball mold.

Generally, in this type of mold, resin injection ports (also referred to below simply as "injection ports") for introducing resin into the cavity are provided along the parting plane. However, circular injection ports having an opening with a specific surface area to keep imbalances in the injection pressure and resin flow rate from arising are generally formed at sizes and positions which do not overlap with the dimple-forming protrusions (on the molded ball surface, at positions which correspond to lands where dimples do not form). For example, JP-A 2000-42143 mentions providing circular injection ports having a diameter of about 0.5 to about 1.0 mm. However, the intervals between the dimples become smaller as the dimples are arranged more densely in order to bring the dimple surface coverage closer to 100%; as a result, the surface area available for providing injection ports decreases. To address this, it is common to reduce the diameter of the injection ports. Yet, imbalances in the resin injection pressure or flow rate often arise. Hence, when a cover is formed over a core or a sphere composed of a core encased by another layer such as an intermediate layer, the core may end up deformed or the position of the core within the mold may end up off-center, leading to various problems, such as molding defects, scorching or eccentricity. Golf balls with these problems have an inferior quality, such as durability, symmetry and appearance. Also, as shown in FIG. 9, by adjusting the sizes of the dimple-forming protrusions 40 and making the interval between those dimple-forming protrusions 40 which adjoin the injection port 20 larger, it is possible to secure an area adequate for the surface area of the opening in the injection port 20, although further increase in the uniformity of the aerodynamic properties or the surface coverage is difficult.

Thus, various innovations have hitherto been made to increase the dimple surface coverage and thereby enhance the aerodynamic properties. However, a fundamental solution to the conflicting problems of mold design and dimple design has yet to be achieved. In order to further enhance the aerodynamic properties of the golf ball and also improve the degree of freedom in mold design, an approach that resolves the above problems has been sought.

SUMMARY OF THE INVENTION

It is therefore an object of the present invention to provide a golf ball mold which makes it easy to increase the dimple surface coverage, enables an injection port having an opening with a specific surface area to be provided even when the dimples are densely formed, and enables stable molding to be carried out without giving rise to the above-described production problems. Further objects of the invention are to provide a golf ball molded using such a mold and a method of manufacturing golf balls using such a mold.

To achieve the above object, the invention provides the following golf ball mold, golf ball manufacturing method and golf ball.

[1] A golf ball mold comprising a plurality of mold parts which removably mate to form a cavity having an inner wall with a plurality of dimple-forming protrusions thereon, wherein a non-circular resin injection port is formed between a plurality of mutually adjoining dimple-forming protrusions which include dimple-forming protrusions that lie across a parting line of the mold.

[2] The golf ball mold of [1], wherein the non-circular resin injection port is provided so as to intersect the parting line.

[3] The golf ball mold of [1], wherein the non-circular resin injection port has an opening with a margin therearound at least some portion of which is formed in a shape that conforms with a bottom margin of a neighboring dimple-forming protrusion.

[4] The golf ball mold of [3], wherein at least some portion of the margin around the opening of the non-circular resin injection port coincides with a bottom margin of an adjoining dimple-forming protrusion.

[5] The golf ball mold of [1], wherein the dimple-forming protrusions adjoining the non-circular resin injection port have an interval therebetween of not more than about 1.2 mm.

[6] The golf ball mold of [1], wherein the non-circular resin injection port has an opening with a surface area of from about 0.2 to about 2.5 mm$^2$.

[7] The golf ball mold of [1], wherein the resin injection port has a shape which is formed with rotational symmetry and which has a center of symmetry that lies on the parting line.

[8] The golf ball mold of [1], wherein the resin injection port has an aspect ratio (width/height) of from about 1.0 to about 8.0.

[9] The golf ball mold of [1], wherein the dimple-forming protrusions have shapes that are free of straight lines.

[10] A golf ball which is molded using the golf ball mold of [1].

[11] A method of manufacturing golf balls, comprising the steps of molding a golf ball using the golf ball mold of [1], then trimming flash that has formed on a surface of the golf ball.

In the golf ball mold of the present invention, by forming a non-circular resin injection port between a plurality of mutually adjoining dimple-forming protrusions which include dimple-forming protrusions that lie across a parting line of the mold, the shape of the injection port is not limited to the ordinary circular or oval shapes of conventional injection ports, thus making it possible to ensure that the injection port has at least a given cross-sectional surface area even when the interval between the adjoining dimples has been made smaller than in the prior art. Therefore, even when the dimples are tightly arranged in the vicinity of the parting line so as to increase the surface coverage of the dimples, a resin injection port having an opening of a given surface area can be provided without being affected by the dimple configuration.

Also, by using the mold of the invention, even when manufacturing golf balls with a high dimple surface coverage on which the dimples are tightly arranged particularly up to the vicinity of the resin injection port, imbalances in the resin injection pressure and flow rate during injection molding are suppressed, enabling golf balls to be manufactured without giving rise to production problems such as molding defects, scorching, core deformation and core eccentricity.

In addition, because golf balls molded using the inventive mold have a high dimple surface coverage and symmetry, the aerodynamic properties can be improved, enabling an excellent flight performance to be achieved and making it possible to minimize the variability of flight.

BRIEF DESCRIPTION OF THE DIAGRAMS

DETAILED DESCRIPTION OF THE INVENTION

The golf ball mold of the invention is described more fully below in conjunction with the appended diagrams.

The "parting line" and "parting plane" of the mold, as used in the description below, are defined as follows.

The "parting line" is a line that serves as a reference when the mold splits into a plurality of parts. For example, in the case of a mold that splits into two parts, the parting line refers to a line that serves as a reference for the mating of the upper mold half with the lower mold half, and is rectilinear. The "parting plane" of the mold refers to the area of contact when the respective mold parts that have been separated based on the above parting line are joined together. In the present invention, because a plurality of dimple-forming protrusions that lie across the parting line are provided on the parting plane, the parting plane has convex features due to the dimple-forming protrusions and also has concave features which correspond to the convex features. Specifically, as shown in FIGS. 1A and 1B, the parting plane 3 of the mold has convex features 3a and concave features 3b; rectilinear sections other than these convex features 3a and concave features 3b coincide with the parting line PL.

The golf ball mold of the invention has a plurality of mold parts which split along a parting line and removably mate to form a spherical cavity for disposing at the interior a core or a sphere composed of a plurality of layers. The number of parts into which the mold splits may be suitably set according to the mold specifications and is not subject to any particular limitation. For example, when the number of parting planes in the mold is small, as in a two-part mold having a single parting plane, mold fabrication costs and limitations in the arrangement of the dimples can be reduced. On the other hand, when a plurality of parting planes is provided and the mold is split into a larger number of parts, the mold releasability of the molded piece can be enhanced. For the sake of simplicity, the mold used in the description that follows is, as shown in FIG. 8, a two-part mold which splits along the golf ball equator as the parting line.

Figure 1A:
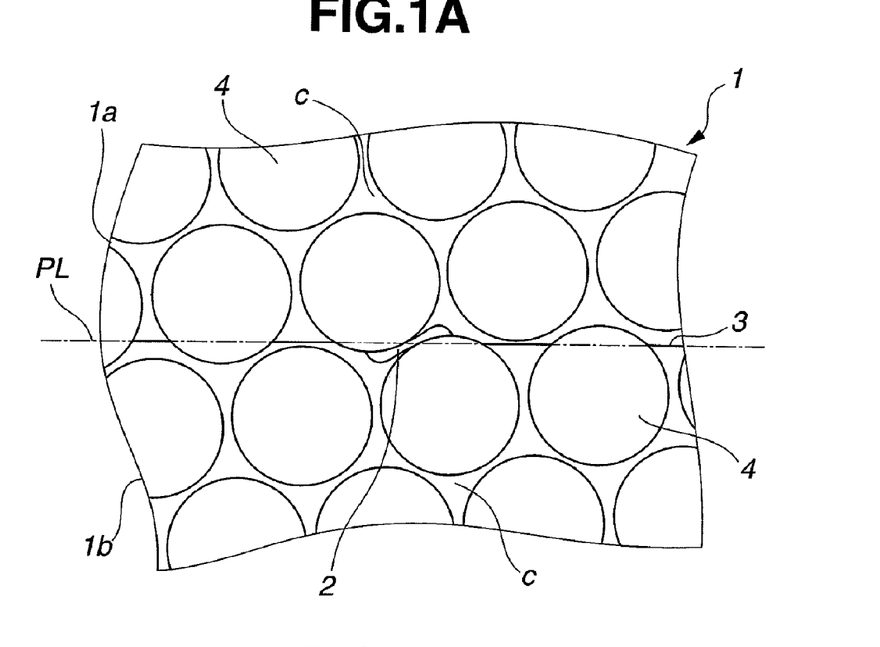
FIG. 1A is an enlarged plan view of the vicinity of an injection port in a golf ball mold according to an embodiment of the invention.
Figure 1B:
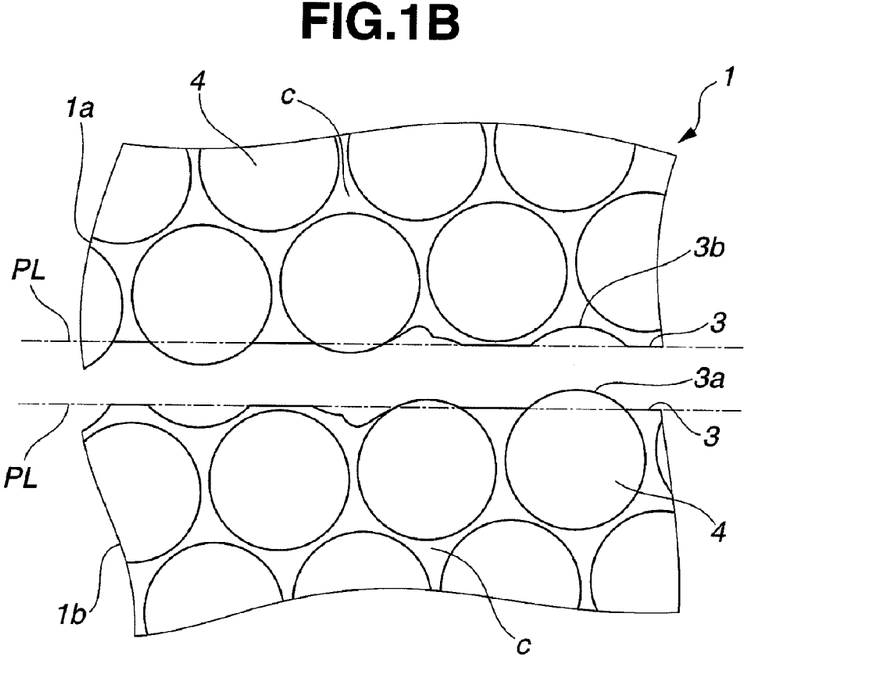
FIG. 1B is a diagram showing the same mold in a parted state.

FIG. 1A is an enlarged plan view of the vicinity of a resin injection port 2 in a golf ball mold 1 according to one embodiment of the present invention, and FIG. 1B is a view showing the same mold 1 in a state where it has been split at a parting plane 3 into an upper mold half 1a and a lower mold half 1b. The basic construction generally accords with that of the mold shown in FIG. 8. Hence, although an overall view is not shown here, this mold 1 has an upper mold half 1a and a lower mold half 1b which part along the golf ball equator as the parting line PL and removably mate to form a spherical cavity c for disposing at the interior a core or a sphere composed of a plurality of layers. A plurality of dimple-forming protrusions 4 for forming dimples of circular shape as seen from above on the surface of the golf ball are provided on the inner wall of the cavity c, in addition to which a plurality of dimple-forming protrusions 4 are provided so as to lie across the parting line PL. Moreover, a resin injection port 2 having an opening of a specific surface area is formed along the parting plane 3 of the upper and lower mold halves. Here, as shown in FIG. 1B, due to the dimple-forming protrusions 4 which lie across the parting line PL, the parting plane 3 has convex features 3a and concave features 3b which correspond to the convex features 3a.

In FIG. 1, the injection port 2 is formed so as to lie across the parting line PL between two dimple-forming protrusions 4 which lie across the parting line PL. The margin around the opening of the injection port 2 has a non-circular shape obtained by joining together with rotational symmetry the ends of two substantially S-shaped curves, with approximately one-half of each of the two curves being formed at one end in a shape that coincides with the bottom margin of one of the dimple-forming protrusions 4. Here, the center of symmetry of the two curves lies on the parting line PL. The approximate one-half of each curve at the other end traces a gradual curve which swells out into a region where dimples do not form between the adjoining dimple-forming protrusions 4 (a region corresponding to, on the surface of the molded ball, a land area where dimples do not form), and is joined to the end of the other substantially S-shaped curve. This shape is not subject to any particular limitation, and may be suitably set in accordance with, for example, the dimple configuration and surface area of the opening that is required. From the standpoint of achieving a good resin flow, it is preferable to form this as a gradual curve like that shown in FIG. 1 so as to provide a shape without any rectilinear portions.

In the mold 1 of the present invention, the above injection port 2 is formed at a position which is set as appropriate for the mold specifications and is not subject to any particular limitation. However, from the standpoint of the symmetry of resin flow during injection molding, the injection port 2 is preferably provided so as to intersect the parting line PL. Also, from a similar standpoint, it is more preferable for the margin around the opening of the injection port 2 to have a shape which, as shown in FIG. 1, is formed with rotational symmetry and so as to have a center of symmetry that lies on the parting line PL. Likewise, the injection port 2 may be suitably provided in a number which, while not subject to any particular limitation, can be set as required to from 1 to about 8.

Figure 2:
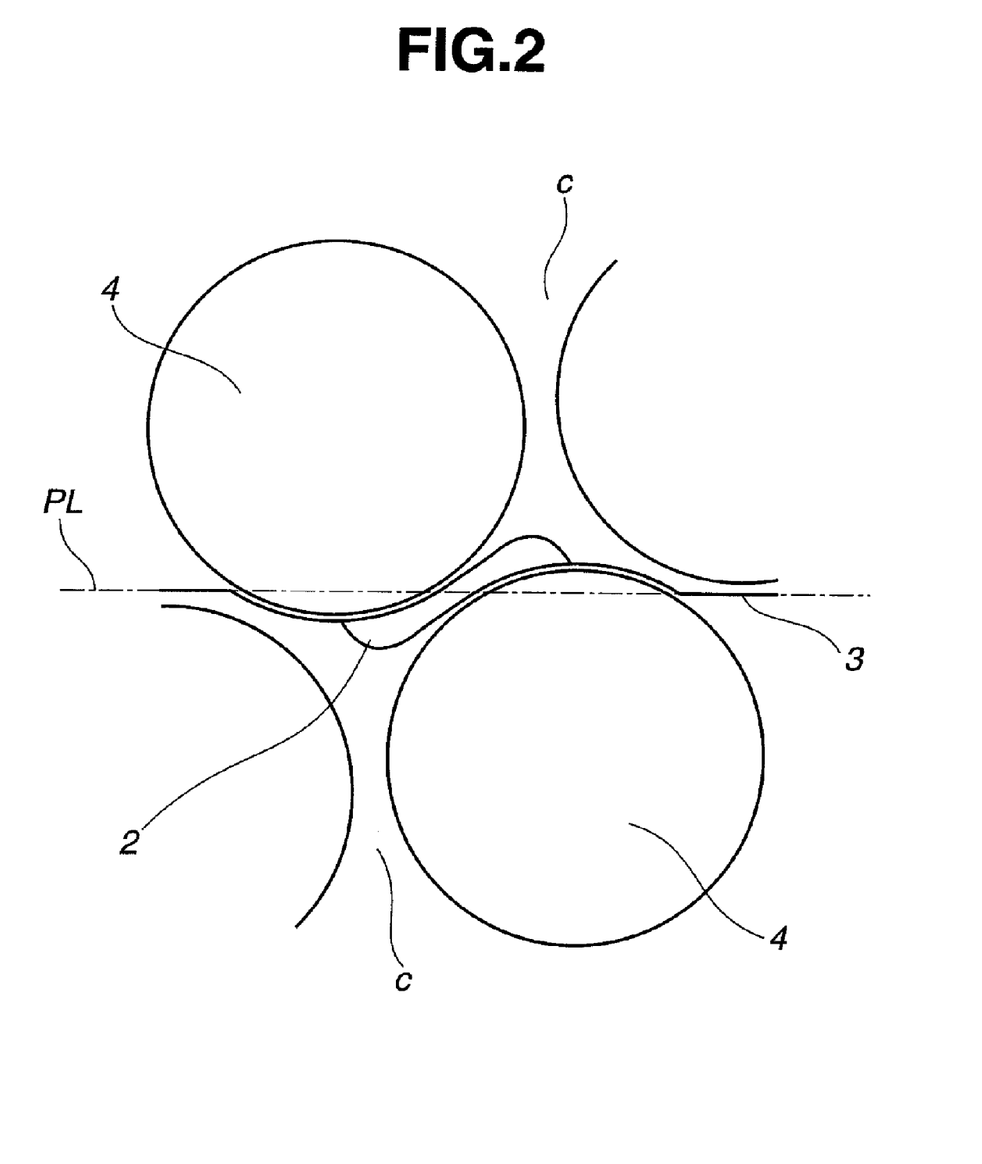
FIG. 2 is an enlarged plan view of the vicinity of an injection port in a golf ball mold according to another embodiment of the invention.
Figure 3:
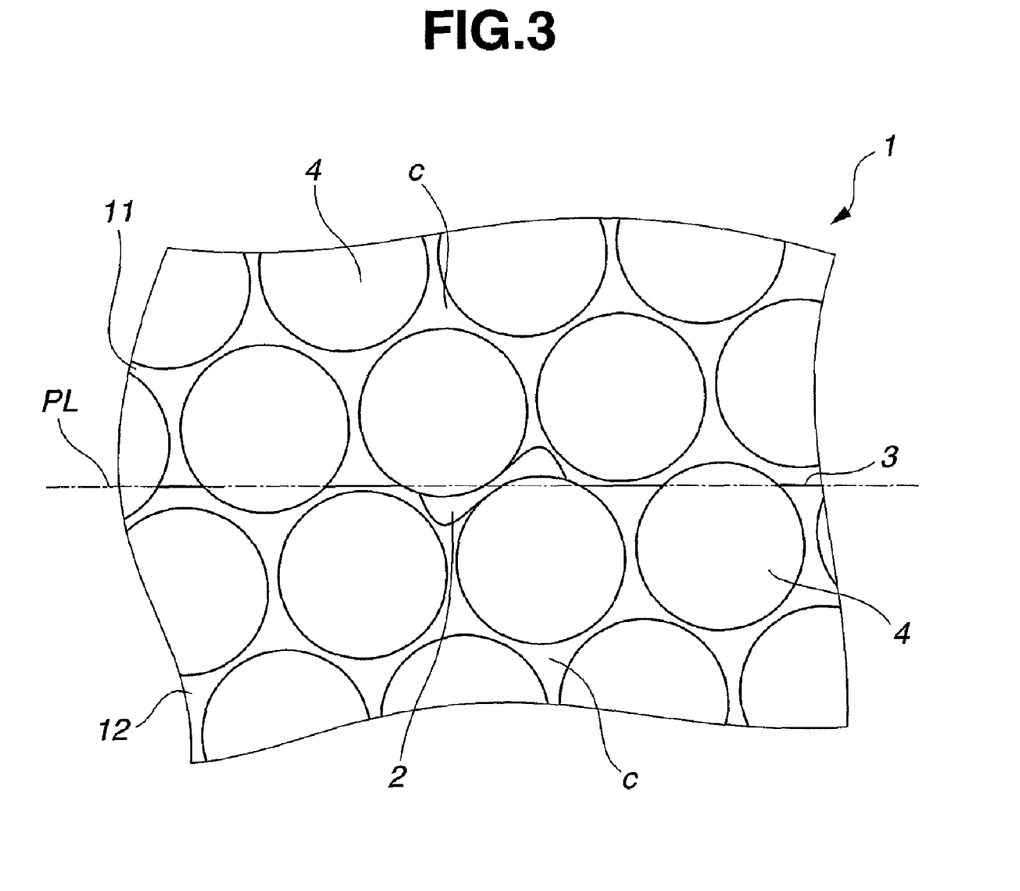
FIG. 3 is an enlarged plan view of the vicinity of an injection port in a golf ball mold according to yet another embodiment of the invention.
Figure 4:
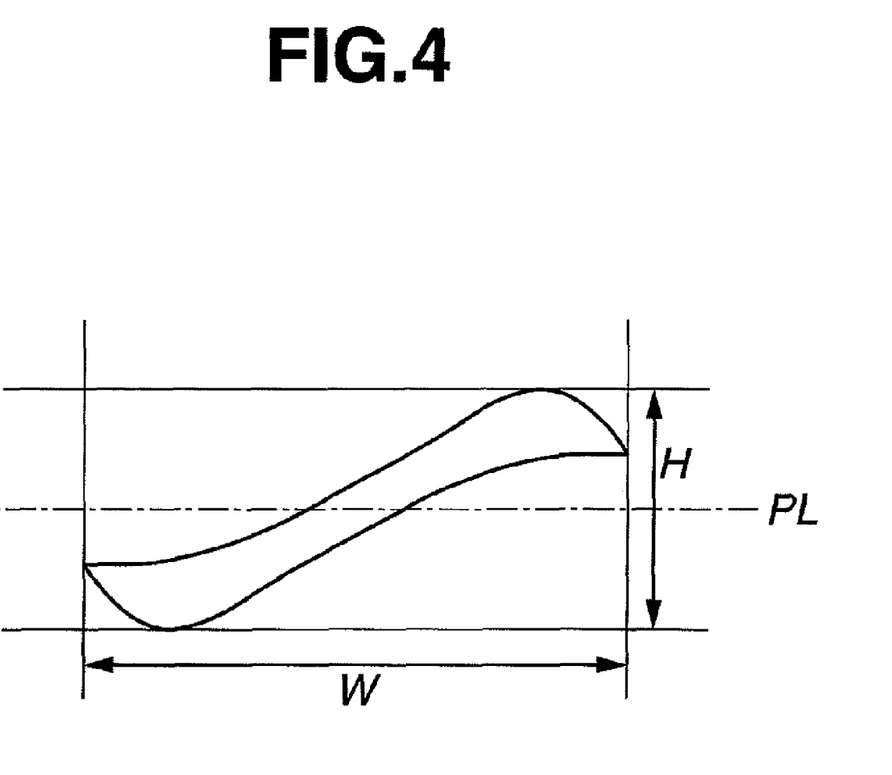
FIG. 4 is a further enlarged diagram showing the shape of the resin injection port in the mold of FIG. 1.

FIG. 1 shows an example in which a portion of the margin around the opening of the injection port 2 has a shape which coincides with the shape of a bottom margin of the above dimple-forming protrusion 4. However, as shown in FIG. 2, so long as these have mutually conforming shapes, they may be separated by some interval; that is, a portion of the margin around the opening of the injection port 2 does not necessarily have to be made to coincide with the bottom margin of the dimple-forming protrusion 4. In cases where the intervals between adjoining dimple-forming protrusions 4 are small and it is necessary to ensure that the opening of the injection port 2 has a larger surface area, the portion of the margin around the opening of the injection port 2 which conforms with the bottom margin of the dimple-forming protrusion 4 may be made to coincide with the bottom margin of the adjoining dimple-forming protrusion 4.

The interval between the dimple-forming protrusions 4 (minimum distance between dimple edges) adjoining the injection port 2 is suitably set in accordance with the dimple arrangement, and is not subject to any particular limitation. The injection port which is formed in the inventive mold 1 may be suitably employed also between adjoining dimple-forming protrusions 4 separated by a very small interval. Specifically, suitable use is possible at an interval of up to about 1.2 mm, particularly up to about 1.0 mm, and most particularly up to about 0.8 mm. The lower limit in such an interval at which the injection port 2 may be formed is set in the present invention to about 0.3 mm or more, and preferably about 0.5 mm or more.

The surface area of the opening in the above injection port 2 is not subject to any particular limitation and may be set as appropriate. However, from the standpoint of dispersing the resin injection pressure and suppressing deformation and eccentricity of the core, etc., the surface area of the opening per injection port is preferably set in a range of from about 0.2 to about 2.5 mm$^2$, and more preferably from about 0.5 to about 1.1 mm$^2$. For example, by making the outwardly swelling portion of the substantially S-shaped injection port larger than in the shape shown in FIG. 1, an opening having a larger surface area can be achieved.

Also, from the standpoint of enabling trimming and buffing of the molded golf ball to be carried out more uniformly and reliably, letting the width and height based on the parting line PL be respectively W and H, the aspect ratio (W/H), although not subject to any particular limitation, may be set to preferably from about 1.0 to about 8.0, and more preferably from about 2.0 to about 5.0.

The shape of the above dimple-forming protrusions 4, although illustrated in FIG. 1 for an example in which dimple-forming projections 4 having a circular shape as seen from above are provided, is not subject to any particular limitation; any shape that is known as a dimple shape may be employed for this purpose. In the present invention, advantageous use may be made of shapes that are free of straight lines, such as circular, oval or teardrop shapes.

The material used in the inventive mold is not subject to any particular limitation. A known material may be used.

When golf balls are molded using the golf ball mold of the invention, the molding method and conditions may be similar to those used with conventional molds. For example, when a core or the like is placed in the mold and injection molding is carried out, the core, etc. is generally supported with support pins. Such support pins may also be configured in the same way as in the prior art. A specific method for doing so is described below. Here, although not shown in the diagrams, in cases where two-piece solid golf balls are manufactured by injection-molding the cover around a solid core using a two-part mold that splits into upper and lower mold halves, with the solid core supported by support pins at the center of the cavity, the upper and lower mold halves are removably mated and a known molding material capable of being used to mold golf ball covers, such as a known ionomeric resin, is passed through each of the resin injection ports and fed in a molten state to the interior of the cavity. After cooling and solidification, the upper and lower mold halves are separated, the molded piece is extracted and the gates are cut, following which flash is removed by trimming according to a conventional method.

When forming a golf ball cover using the inventive mold, a known thermoplastic resin may be used without particular limitation, although preferred use may be made of, for example, an ionomeric resin or a urethane resin.

The thickness of the cover that is formed may be suitably set according to such considerations as the construction and materials of the golf ball to be manufactured, and is not subject to any particular limitation. However, as described above, because it is possible with the inventive mold to disperse the resin injection pressure during injection molding and thereby inhibit deformation or eccentricity of the core, etc., the mold of the invention is particularly effective when a cover having a thickness of 1.5 mm or less that is readily subject to the influence of the injection pressure is formed. By making the cover thinner, a golf ball which fully elicits the resilience of the core or the intermediate layer can be provided.

The range in the cover thickness is preferably set to from 0.5 to 1.5 mm, more preferably from 0.6 to 1.2 mm, and even more preferably from 0.7 to 1 mm. At a cover thickness greater than the above range, it may not be possible to fully elicit the resilience of the core or the intermediate layer. On the other hand, at a cover thickness smaller than the above range, molding defects may arise.

The shape, number and arrangement of dimples formed by the dimple-forming protrusions are not subject to any particular limitation, and may be set as appropriate for the ball specifications. For example, the dimple diameter in the present invention may be set in a range of preferably from 2.5 to 6 mm, more preferably from 3 to 5.5 mm, and even more preferably from 3.5 to 5 mm. The dimple depth, which is also not subject to any particular limitation, may be set in a range of preferably from 0.1 to 0.2 mm, more preferably from 0.125 to 0.15 mm, and even more preferably from 0.135 to 0.144 mm. In particular, owing to the possibility of large changes in dimple shape during the trimming operation to remove flash that has formed during injection molding, it is preferable for dimples disposed near the resin injection ports to have the specific diameter and depth indicated above.

From the standpoint of the aerodynamic properties, the surface coverage by the dimples on the surface of the ball is set to preferably at least 70%, more preferably at least 75%, and even more preferably at least 80%. By using the mold of the invention, balls having a high surface coverage can easily be manufactured.

Figure 5:
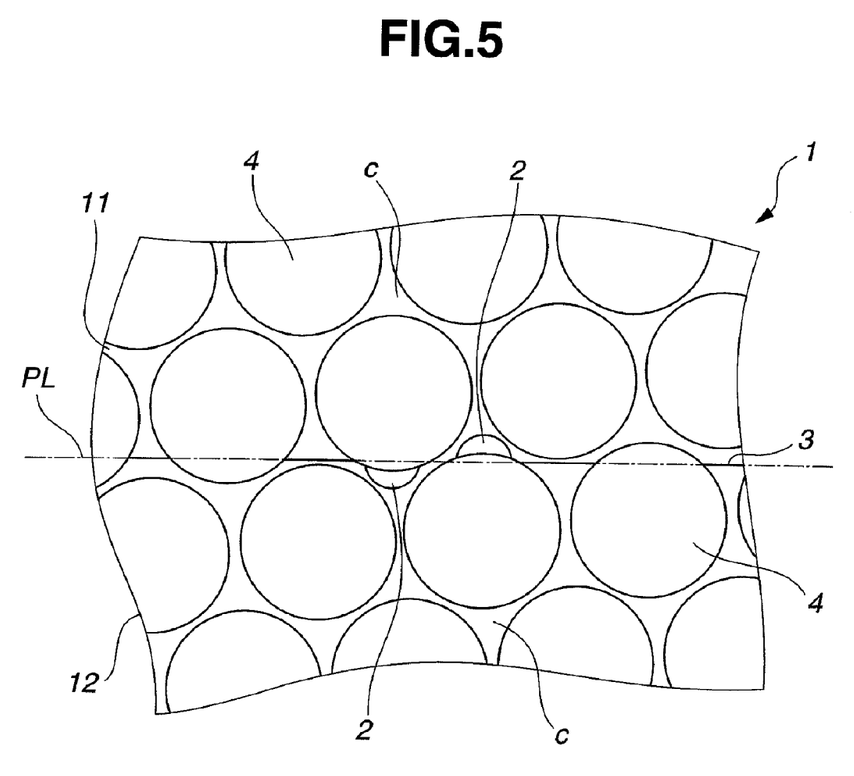
FIG. 5 is an enlarged plan view of the vicinity of injection ports in a golf ball mold according to a different embodiment of the invention.

Although preferred embodiments of the present invention have been described above in conjunction with the diagrams, the golf ball mold and golf ball of the invention are not limited by the diagrams and the above embodiments and may be suitably modified without departing from the spirit and scope of the present invention. For example, the number of parts into which the mold splits and the shape, size and number of resin injection ports disposed in the mold are not limited by the details given in the foregoing embodiments and diagrams—suitable modification of the shapes and positions of the resin injection ports in the manner shown in FIG. 5 also being possible, and may be suitably modified and selected without departing from the spirit and scope of the invention.

Figure 6:
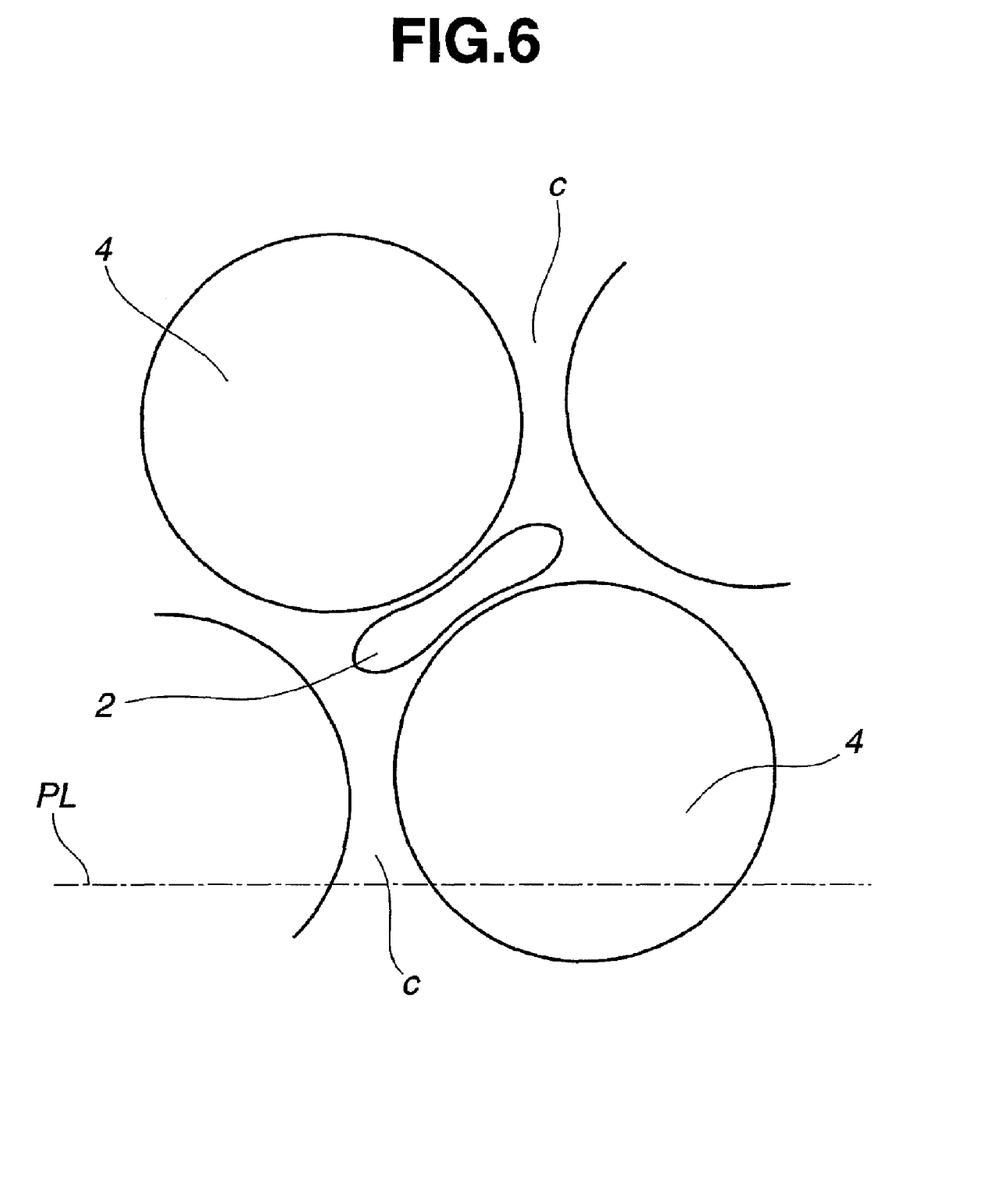
FIG. 6 is an enlarged plan view of the vicinity of an injection port in a golf ball mold according to a further embodiment of the invention.
Figure 7:
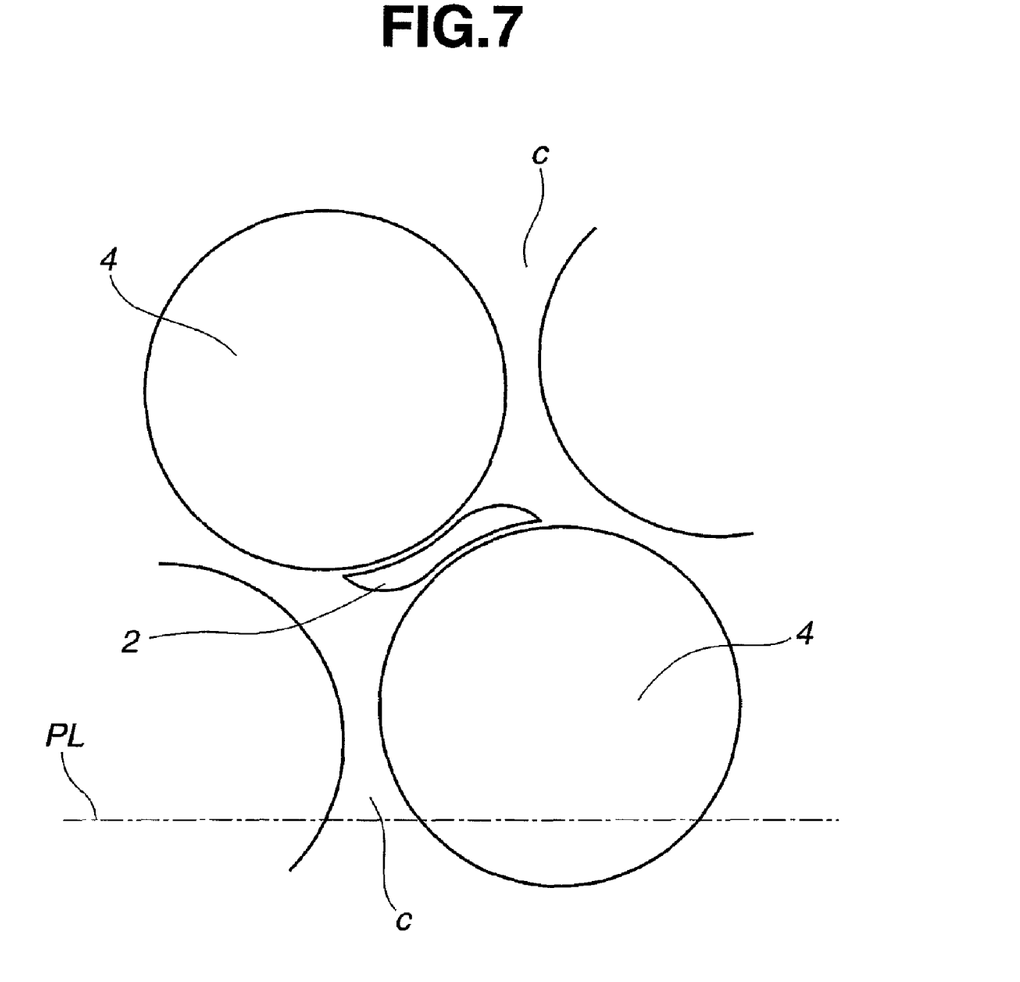
FIG. 7 is an enlarged plan view of the vicinity of an injection port in a golf ball mold according to a still further embodiment of the invention.

The positions where resin injection ports are provided do not necessarily have to be positions on the parting line or parting plane of the mold. For example, as shown in FIGS. 6 and 7, the resin injection ports may also be disposed between dimple-forming protrusions located at positions separated by a given interval from the parting line.

As explained above, the golf ball mold of the present invention enables a resin injection port having an opening of a given surface area to be formed without affecting the dimple arrangement, thus making it possible to achieve dimple arrangements that are impossible in molds provided with conventional circular resin injection ports and enabling production trouble due to imbalances in resin flow and injection pressure that has hitherto been a problem to be resolved. Moreover, because dimples can now be formed to a high density even in the vicinity of resin injection ports where the dense formation of dimples had not previously been possible, the degree of freedom in dimple design is increased even further, enabling golf balls having a very high dimple surface coverage and symmetry to be easily obtained. Therefore, golf balls manufactured using the golf ball mold of the present invention are able to achieve good aerodynamic properties even more effectively than in the prior art, making it possible to impart the balls with an outstanding flight performance.

The invention claimed is:

1. A golf ball mold comprising a plurality of mold parts which removably mate to form a cavity having an inner wall with a plurality of dimple-forming protrusions thereon,
    wherein a non-circular resin injection port is formed between a plurality of mutually adjoining dimple-forming protrusions which include dimple-forming protrusions that lie across a parting line of the mold,
    wherein the non-circular resin injection port has an opening with a margin therearound at least some portion of which is formed in a shape that conforms with a bottom margin of a neighboring dimple-forming protrusion,
    wherein the shape of non-circular resin injection port has no rectilinear portions,
    wherein the non-circular resin injection port,
    wherein the non-circular resin injection port has a shape selected from the group consisting of an S-shape, a crescent shape and an hourglass shape.

2. The golf ball mold of claim 1, wherein the non-circular resin injection port is provided so as to intersect the parting line.

3. The golf ball mold of claim 1, wherein at least some portion of the margin around the opening of the non-circular resin injection port coincides with a bottom margin of an adjoining dimple-forming protrusion.

4. The golf ball mold of claim 1, wherein the dimple-forming protrusions adjoining the non-circular resin injection port have an interval therebetween of not more than about 1.2 mm.

5. The golf ball mold of claim 1, wherein the non-circular resin injection port has an opening with a surface area of from about 0.2 to about 2.5 mm$^2$.

6. The golf ball mold of claim 1, wherein the resin injection port has a shape which is formed with rotational symmetry and which has a center of symmetry that lies on the parting line.

7. The golf ball mold of claim 1, wherein the resin injection port has an aspect ratio (width/height) of from about 1.0 to about 8.0.

8. The golf ball mold of claim 1, wherein the dimple-forming protrusions have shapes that are free of straight lines.

9. A method of manufacturing golf balls, comprising the steps of molding a golf ball using the golf ball mold of claim 1, then trimming flash that has formed on a surface of the golf ball.

10. A golf ball mold comprising a plurality of mold parts which removably mate to form a cavity having an inner wall with a plurality of dimple-forming protrusions thereon,
    wherein a non-circular resin injection port is formed between a plurality of mutually adjoining dimple-forming protrusions which include dimple-forming protrusions that lie across a parting line of the mold,
    wherein the non-circular resin injection port has an opening with a margin therearound at least some portion of which is formed in a shape that conforms with a bottom margin of a neighboring dimple-forming protrusion, wherein the shape of non-circular resin injection port has no rectilinear portions, wherein the shape of the non-circular resin injection port has a shape formed by joining together, with rotational symmetry, two substantially S-shaped curves.

11. The golf ball mold of claim 1, wherein an ionomeric resin is used as a molding material to form a golf ball cover.

12. The golf ball mold of claim 1, wherein a urethane resin is used as the molding material to form the golf ball cover.

* * * * *